United States Patent
Noldus et al.

(10) Patent No.: US 8,254,940 B2
(45) Date of Patent: *Aug. 28, 2012

(54) HANDLING OF SERVICES FOR A CALLED SUBSCRIBER

(75) Inventors: Rogier Noldus, Goirle (NL); Arvind Sharma, Forstern (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 13/353,499

(22) Filed: Jan. 19, 2012

(65) Prior Publication Data

US 2012/0122450 A1 May 17, 2012

Related U.S. Application Data

(63) Continuation of application No. 12/097,692, filed as application No. PCT/EP2005/056843 on Dec. 16, 2005, now Pat. No. 8,126,460.

(51) Int. Cl.
*H04Q 7/20* (2006.01)
(52) U.S. Cl. ............... 455/445; 455/435.1; 455/433; 455/432; 370/331
(58) Field of Classification Search ............ 455/445, 455/435.1, 433, 432; 370/331
See application file for complete search history.

(56) References Cited

U.S. PATENT DOCUMENTS

| | | | | |
|---|---|---|---|---|
| 6,112,090 A | * | 8/2000 | Valentine | 455/445 |
| 6,122,510 A | * | 9/2000 | Granberg | 455/433 |
| 6,353,740 B1 | * | 3/2002 | Granberg | 455/432.1 |
| 6,574,323 B1 | * | 6/2003 | Manuel et al. | 379/207.02 |
| 2002/0049065 A1 | * | 4/2002 | Wallenius | 455/461 |
| 2003/0100304 A1 | * | 5/2003 | Hazelwood | 455/433 |
| 2004/0120494 A1 | * | 6/2004 | Jiang et al. | 379/210.01 |
| 2005/0078812 A1 | | 4/2005 | Batni et al. | |
| 2006/0291418 A1 | * | 12/2006 | Singh | 370/331 |
| 2009/0005037 A1 | * | 1/2009 | Noldus et al. | 455/433 |

FOREIGN PATENT DOCUMENTS

| | | |
|---|---|---|
| EP | 1 914 970 A2 | 4/2008 |
| JP | H11-098562 A | 4/1999 |
| WO | WO 97/07637 A | 2/1997 |
| WO | WO 97/50232 A1 | 12/1997 |
| WO | WO 2004/103012 A | 11/2004 |
| WO | WO 2007068288 A1 * | 6/2007 |

* cited by examiner

*Primary Examiner* — Charles Shedrick

(57) ABSTRACT

A method and control node and computer program are disclosed for handling Intelligent Network services associated with a call to a subscriber of a mobile telecommunications network, the network comprising said control node, a HLR and one or more SCPs. Said control node a) sends to said HLR one or more requests for routing information associated with said call; b) receives from said HLR service trigger elements associated with said services; c) uses said trigger elements for invoking said services in said one ore more SCPs; and d) receives from said one or more SCPs information related to said services associated with said trigger elements.

21 Claims, 6 Drawing Sheets

HANDLING OF SERVICES FOR A CALLED SUBSCRIBER

CROSS REFERENCE TO RELATED APPLICATIONS

This application is a continuation of U.S. application Ser. No. 12/097,692, filed on Jun. 16, 2008, which was the National Stage of International Application No. PCT/EP2005/056843, filed on Dec. 16, 2005.

FIELD OF INVENTION

The invention relates to a method and control node for handling Intelligent Network services associated with a call to a subscriber of a mobile telecommunications network.

BACKGROUND

Intelligent Network services are well known in the state of the art telecommunications networks such as GSM (Global System for Mobile communications).

The central component of the Core Network subsystem of a GSM network is the Mobile services Switching Center (MSC). It acts like a switching node of the PSTN or ISDN, and additionally provides all the functionality needed to handle a mobile subscriber, such as registration, authentication, location updating, handovers, and call routing to a roaming subscriber. These services are provided in conjunction with several functional entities, which together form the Core Network subsystem. A Gateway MSC (GMSC) provides the connection to the fixed networks (such as the PSTN or ISDN). Signaling between functional entities in the Core Network subsystem uses Signaling System Number 7 (SS7), used for trunk signaling in ISDN and widely used in current public networks.

The Home Location Register (HLR) and Visitor Location Register (VLR), together with the MSC, provide the call-routing and roaming capabilities of GSM. The HLR contains all the administrative information of each subscriber registered in the corresponding GSM network, along with the current location of the mobile station. The location of the mobile station is typically in the form of the signaling address of the VLR associated with the mobile station. There is logically one HLR per GSM network, although it may be implemented as a distributed database.

The VLR contains selected administrative information from the HLR, necessary for call control and provision of the subscribed services, for each mobile station currently located in the geographical area controlled by the VLR and currently served by that VLR. Although each functional entity can be implemented as an independent unit, currently all manufacturers of switching equipment implement the VLR together with the MSC, so that the geographical area controlled by the MSC corresponds to that controlled by the VLR, thus simplifying the signaling required. The MSC contains no information about particular mobile stations; this information is stored in the location registers.

Next, a typical incoming call setup (mobile terminating call) in a GSM network is described.

When a subscriber places a call to a mobile phone, he dials the telephone number associated with the phone user, the so-called Mobile Station ISDN (MSISDN) number, and the call is routed to the mobile phone operator's Gateway MSC. A gateway is a node used to interconnect two networks. The gateway is often implemented in an MSC, in which case the MSC is referred to as the GMSC. The GMSC acts as the "entrance" from exterior portions of the Public Switched Telephone Network onto the provider's network.

As noted above, the phone is free to roam anywhere in the operator's network or on the networks of roaming partners, including in other countries. So the first job of the Gateway MSC is to determine the current location of the mobile phone in order to connect the call. It does this by consulting the HLR, which, as described above, knows which Visited Location Register (VLR) the phone is associated with at the moment, if any.

When the HLR receives this query message, it determines whether the call should be routed to another number (called a divert), or the call should be routed directly to the mobile station of the called subscriber.

If the owner of the phone has previously requested that all incoming calls be diverted to another number, which supplementary service is also known as Call Forwarding Unconditional (CFU) to a Forwarded-to-Number (FTN), then this FTN is stored in the HLR. If that is the case, then the FTN is returned to the Gateway MSC for immediate routing to that destination.

If the mobile station is not currently associated with a VLR (e.g. because the phone has been turned off), then the HLR returns a number known as the Call Forwarding Not Reachable (CFNRc) number to the GMSC, and the call is forwarded there. Many operators may set this value automatically to the phone's voice mail number, so that callers may leave a message.

Finally, if the HLR knows that the phone is in the jurisdiction of a particular VLR, then it will request a temporary number, a so called Mobile Station Roaming Number (MSRN) from that VLR. This number is relayed to the GMSC, which uses it to route the call to another MSC, called the Visited MSC (VMSC).

When the call is received by the VMSC, the MSRN is used to find the phone's record in the VLR. This record identifies the phone's location area. Paging occurs to all mobile phone masts in that area. When the subscriber's mobile responds, the exact location of the mobile is returned to the VMSC. The VMSC then forwards the call to the appropriate phone mast, and the phone rings. If the subscriber answers, a speech path is created through the VMSC and GMSC back to the network of the person making the call, and a normal telephone call follows.

It is also possible that the phone call is not answered. If the subscriber is busy on another call (and call waiting is not being used), then the VMSC routes the call to a pre-determined Call Forwarding Busy (CFB) number. Similarly, if the subscriber does not answer the call after a period of time (typically 30 seconds), then the VMSC routes the call to a pre-determined Call Forwarding No Reply (CFNRy) number. Once again, the operator may decide to set this value by default to the voice mail of the mobile so that callers can leave a message.

An Intelligent Network (IN) is a network that is coupled to a telecommunications network that enables operators to deploy operator-specific Value Added Services (VAS). The intelligence that resides in the switch is augmented by intelligence from the Intelligent Network, which is placed in computer nodes that are distributed throughout the network. This provides the network operator with the means to develop, deploy and control services more efficiently. New services can be rapidly introduced into the telecommunications network. Once introduced, services are easily customized to meet individual customers' needs.

IN services are typically provided by a Service Control Point (SCP). An SCP is a control computer that communicates with other nodes and entities in the telecommunications network. The SCP comprises the service logic of one or more IN services and optionally IN service subscription data that allows the SCP to execute an IN service in accordance with the specific settings of a subscriber, i.e. tailor the service execution to the subscriber. When a call is established, the telecommunications network may query the SCP and ask for instructions for handling this call. For instance, an SCP is consulted to provide the translation of an 800 number to an actual phone number and to bill the owner of the 800 number for the call. SCPs may be physically separated from other components of the Intelligent Network or may be combined with these other components into a single node.

In a GSM network the IN service subscription information is stored in the HLR. Two types of information reside in the HLR: (1) static subscriber information and (2) dynamic subscriber information. The latter is e.g. needed to allow incoming calls to be routed to the mobile subscriber. The HLR stores, amongst others:
- the International Mobile Subscriber Identity (IMSI); an internal subscriber identity used only by the network;
- MSISDN number;
- VLR address;
- subscriber data on supplementary services.

IN services may be divided into two categories. One category comprises services to be invoked for subscribers who initiate a call (Mobile Originated Call—MOC). These services are called Mobile Originating (MO) services. An example of an MO service is outgoing call screening.

Each IN service subscriber is marked in his HLR with an Originating CAMEL Subscription Information (O-CSI) element, which is used to identify a specific service at the SCP. The O-CSI initiates the triggering of the MOC service as soon as the subscriber initiates a MO call. In the above example CAMEL is deployed, which stands for "Customised Applications for Mobile network Enhanced Logic". CAMEL was developed as a standard for extending landline IN telephony services such as call waiting and call forwarding to GSM mobile phones.

The other category comprises services to be invoked for subscribers who receive a call (Mobile Terminated Call—MTC). These services are called mobile terminating (MT) services. Examples of mobile terminating services are call diversion services and Personal Greeting Service (PGS). PGS is a service that is associated with a roaming leg. PGS entails that when a signalling connection is established between a GMSC and VMSC (a so called "roaming leg"), then a personalised greeting is played to the calling party. The personalised greeting replaces the conventional alerting tone ("ring tone"). As such, the personalised greeting is primarily related to the establishment of the roaming leg; the ring tone becomes active only when the roaming leg is established and the called party is alerted. Each IN service subscriber is marked in his HLR with a Terminating CAMEL Subscription Information (T-CSI) flag, which is used to identify a specific service at the SCP. This initiates the triggering of the MTC service during a call attempt to the subscriber.

According to the state of the art, a control node may query a HLR during MTC handling to obtain instructions from the HLR. The control node may be a GMSC. In response to the query by the control node, the HLR may send IN trigger information for the terminating call. The IN trigger information exchanged between the HLR and the control node has been standardized. For example T-CSI is the GSM standardized IN trigger information for terminating calls, as specified by 3GPP (3rd Generation Partnership Project) in 3GPP TS 29.002. IN trigger information comprises among others the address of the SCP where the IN service resides and the service key, which identifies a particular IN service within the SCP.

The control node uses the IN trigger information to invoke the IN service in the SCP as specified for the subscriber in the IN trigger information. In response to the service invocation, the SCP sends an instruction to the control node to e.g. continue call set up or to terminate the call depending on the outcome of the service execution. Current networks are typically arranged to handle a single invocation of an IN service for an MTC. Recent developments show however, that there is a need to invoke two or more IN services during terminating call handling.

Patent application WO00/25528 discloses a Service Interaction Manager, which is included in an SCP. The task of the Service Interaction Manager is to determine which of the available services in the SCP should be executed for a subscriber and to invoke those services in a particular sequence.

SUMMARY

It is an object of the invention to provide a method and devices that overcome the drawbacks of the state of the art by permitting subscribers to have more than one IN Service for one call.

In a first aspect of the invention a method is proposed for handling Intelligent Network services associated with a call to a subscriber of a mobile telecommunications network, the network comprising a control node, a Home Location Register and one or more Service Control Points, the method comprising the steps of:
 a. said control node sending to said Home Location Register, one or more requests for routing information associated with said call;
 b. said control node receiving from said Home Location Register service trigger elements associated with said services;
 c. said control node using said trigger elements for invoking said services in said one ore more Service Control Points;
 d. said control node receiving from said one or more Service Control Points information related to said services associated with said trigger elements.

In this way multiple service trigger elements may be handled for a subscriber who is subscribed to one or more IN services pertaining to one call of the subscriber. IN Services need not be aware of the existence of one or more other IN services in that control node for that call. In other words, a first service does not need to know whether a second service will be invoked and vice versa. Since the services do not require knowledge about the possible invocation of other IN services for this call, the services may run on different platforms and may be supplied by different vendors.

There are several embodiments of the invention.

For example, the invention may provide for a Home Location Register to send a first service trigger element of said multiple service trigger elements, in response to a first request for routing information and a second service trigger element of said multiple service trigger elements in response to a second request for routing information.

The first request for routing information may comprise:
 MSISDN number of the subscriber.
The response to the first request for routing information may comprise:
 the first service trigger element.
The second request for routing information may comprise:
 MSISDN number of the subscriber;

an indication that the HLR shall suppress the first service trigger element in the response. This indication may e.g. be the "suppress T-CSI" parameter.

The response to the second request for routing information may comprise:
an MSRN to be used for the call to the served subscriber;
the second service trigger element;
a prefix or a suffix to the MSRN of the subscriber.

The MAP message may be sent from the HLR to a GMSC in multiple Signalling Connection Control Part messages, due to MAP segmentation. A first service, for example a pre-paid charging service, is executed in a first service control point and a second service, for example PGS, is executed in a second SCP.

In this way the pre-paid service and PGS may be offered to the same subscriber; the pre-paid service and PGS may run on different platforms and are not related to one another.

When the present invention is used for PGS, the calling subscriber may hear any call progress message even when early call forwarding or late call forwarding with optimal routing takes place.

Another advantage of the invention is, that PGS may be offered to Virtual Private Network (VPN) subscribers.

In a second aspect of the invention a control node is proposed for handling Intelligent Network services associated with a call to a subscriber of a mobile telecommunications network, the network comprising said control node, an HLR and one or more SCPs; the control node configured to send to said HLR one or more requests for routing information associated with said call; the control node further configured to receive from said HLR multiple service trigger elements associated with said services, and for invoking said services in said one ore more SCPs by using said trigger elements; the control node further configured to receive from said one or more SCPs information related to said services associated with said trigger elements.

In a preferred embodiment the control node comprises a GMSC. The control node may however also comprise a device such as an MSC or an SCP.

A third aspect of the invention proposes a computer program, comprising program instructions for causing a computer to perform the method according to the invention. The computer program may be stored on a carrier and may comprise computer executable instructions for causing a computer to perform the method according to invention.

The carrier of the computer program may be a record medium, computer memory, read-only memory or an electrical carrier signal.

The present invention proposes that multiple IN services may be provided for a particular call type to a subscriber. Hereto, an HLR may have registered multiple indications of particular IN call type subscriptions (hereinafter referred to as IN trigger elements).

DETAILED DESCRIPTION

For the purpose of the present invention, MT call handling in the GMSC may be divided in two logical parts:
(1) Terminating call handling;
(2) Roaming leg handling.

The terminating call handling includes the retrieving of T-CSI from the HLR and the invocation of the first CAMEL service. The first CAMEL service may enforce call restriction or may apply call forwarding. Typically, this first CAMEL service is also used for terminating charging, for the case that the called subscriber is roaming. The HLR may also return other IN trigger elements in combination with T-CSI.

The roaming leg handling includes the retrieving of the MSRN from HLR and the routing of the call from the GMSC to the terminating MSC, where the called party is registered at that moment. It is noticed that "roaming leg" is equally applicable for the case that the subscriber is in the Visited Public Land Mobile Network (VPLMN) and for the case that the subscriber is in the Home Public Land Mobile Network (HPLMN). i.e. "roaming" shall in this case not be associated with "being in another network or in another country".

The present invention proposes that the invocation of two IN services for an MT call is done along the line of above-described distinction. According to the present invention, two types of IN services for MT call may be defined:
(1) IN services that need control over the MT call and that may need the capability to influence the routing of the call. These kind of IN services also need to know the location of the destination subscriber, so charging may be applied.
(2) IN services that are required only for the roaming leg to the destination subscriber. This type of IN service is invoked only when a roaming leg is established, i.e. the GMSC has received an MSRN from the HLR.

If the HLR returns a Forwarded-to-Number (FTN) instead of an MSRN, then there will not be a roaming leg and consequently, no roaming leg-associated IN service will be invoked.

Figure 1:
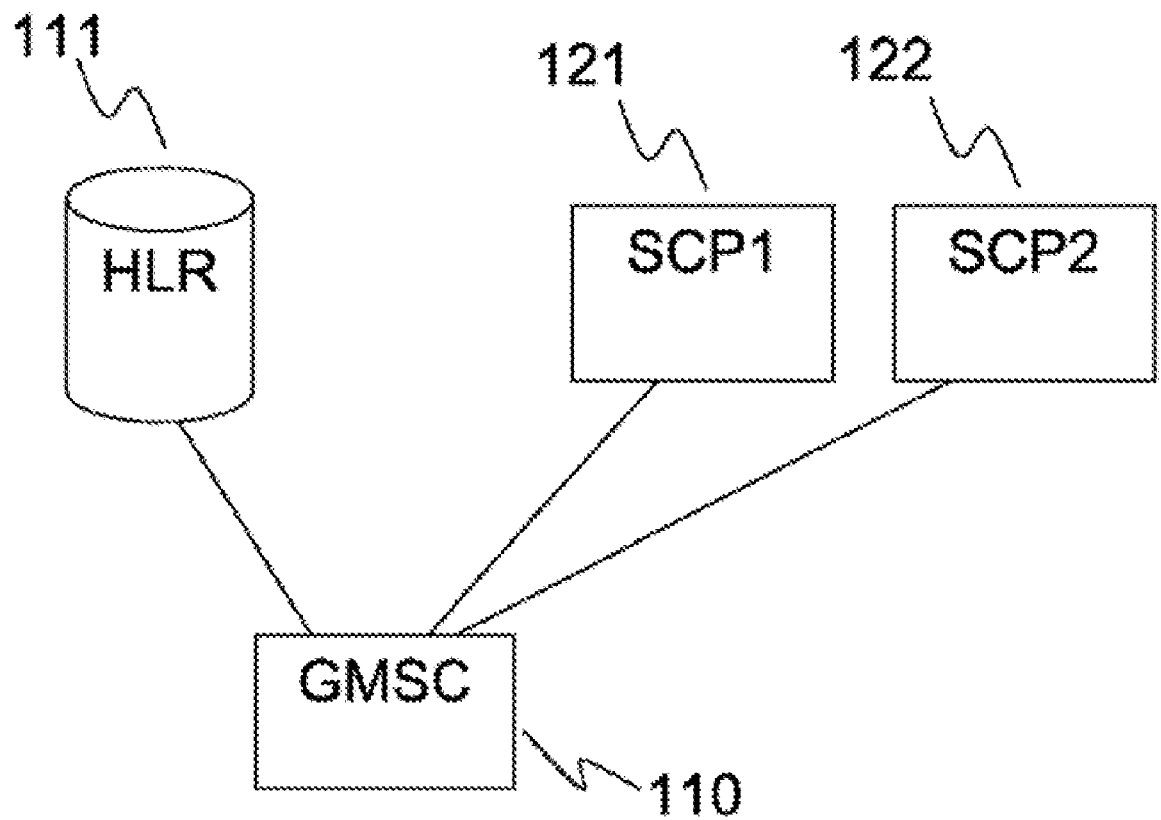
FIG. 1 is a block diagram of a prior art configuration of devices in a mobile telecommunications network.

FIG. 1 is a block diagram of a prior art configuration of devices in a mobile telecommunications network. The shown entities belong, at least conceptually, to an intelligent network that is distinct from the mobile communications network. The intelligent network includes HLR 111, SCP1 121, SCP2 122 and GMSC 110. GMSC 110 interfaces to SCP1 and SCP2 as well as to HLR 111 for performing well known IN triggering functions. SCP1 and SCP2 contain intelligent network services that may be invoked sequentially during the handling of a mobile terminating call.

Figure 2:
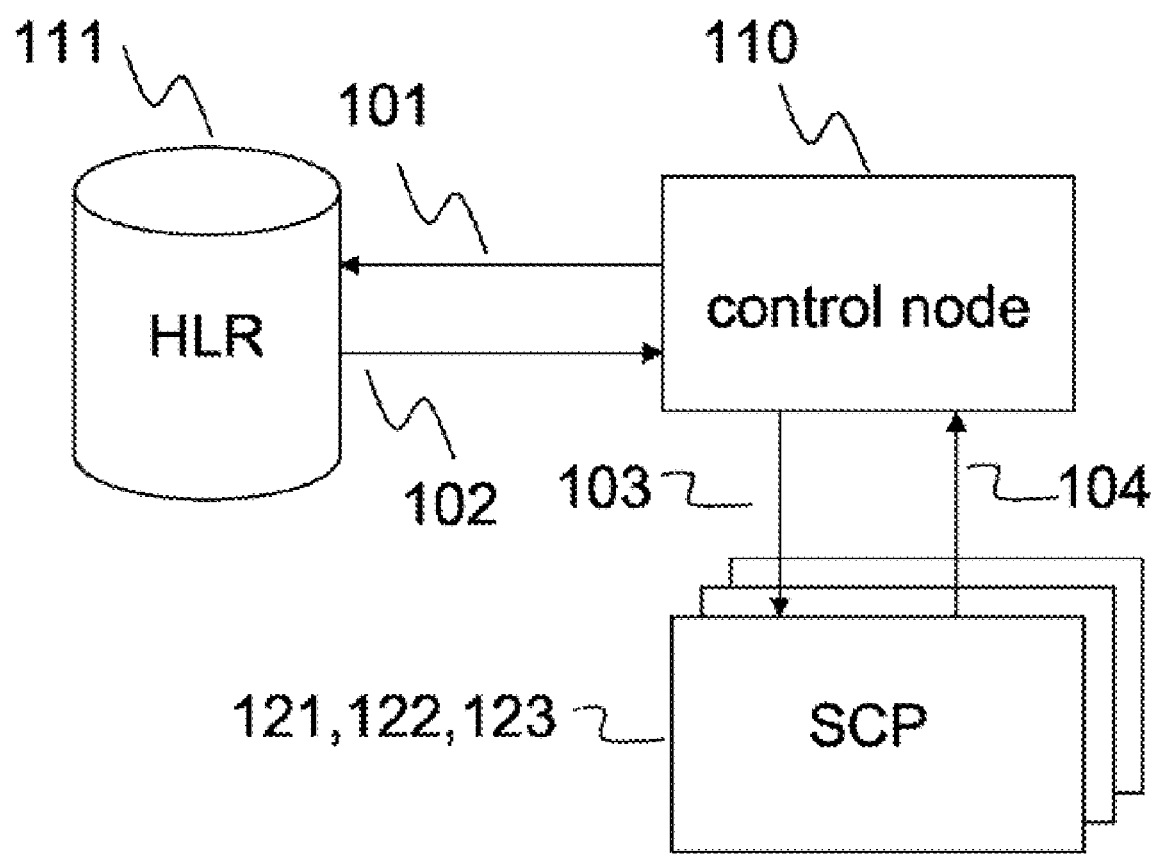
FIG. 2 is a signalling diagram of the method and devices according to the present invention.

FIG. 2 is a signalling diagram of the method and devices according to the present invention with a general overview of relations between various elements. The method comprises next steps:

Step 101 A control node 110 sends to a HLR 111, one or more requests for routing information associated with said call;

Step 102 The HLR 111 sends to said control 110 node multiple service trigger elements associated with said services;

Step 103 The control node 110 uses said trigger elements to invoke one or more services in one ore more Service Control Points 121, 122, 123;

Step 104 The one or more Service Control Points 121, 122, 123 sends to said control node 110 information related to on one or more services associated with said trigger elements.

Figure 3:
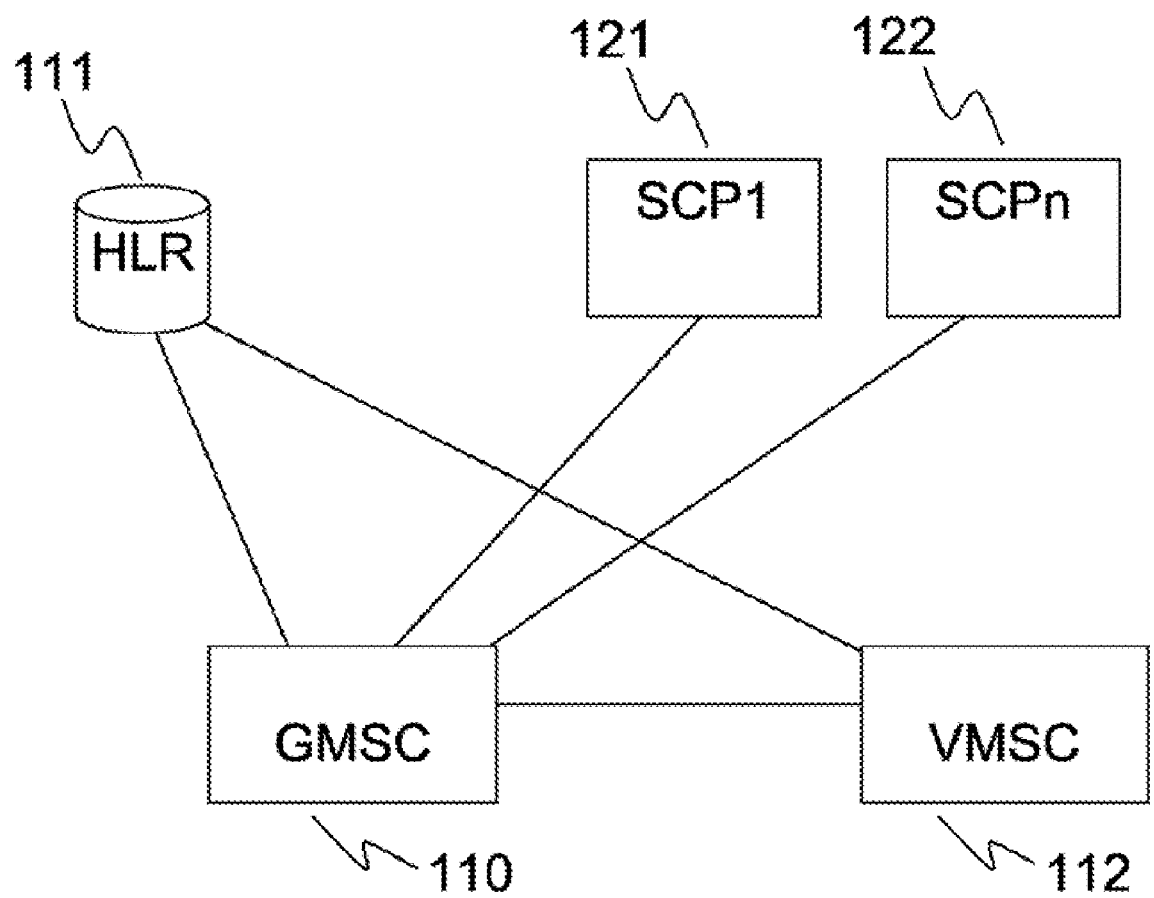
FIG. 3 is a block diagram of devices according to the present invention.

FIG. 3 is a block diagram of devices and their interrelations according to the present invention.

The lines between the blocks (devices) represent communication paths. HLR 111 may communicate with GMSC 110 and to VMSC 112. GMSC may communicate with SCP1 121 and other subsequently invoked SCPs (SCPn) 122. GMSC 110 may communicate with VMSC 112.

Figure 4:
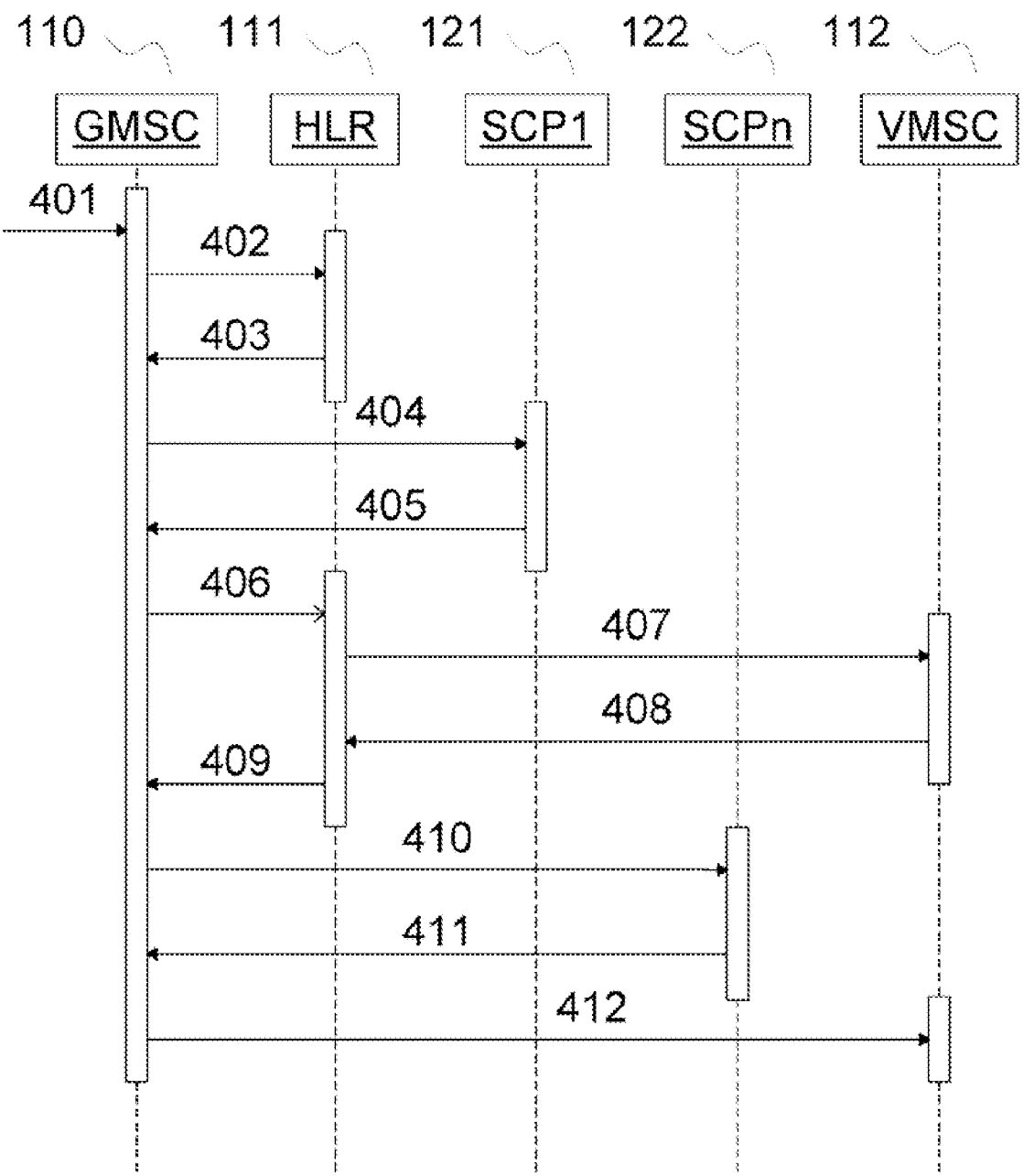
FIG. 4 is a signalling diagram of an embodiment of the method of the present invention.

FIG. 4 is a signalling diagram of an embodiment of the method of the present invention comprising a communication sequence between the devices as shown in FIG. 3, comprising GMSC 110, HLR 111, multiple SCPs 121, 122 and a VMSC 112. In this example a subscriber is subscribed to a CAMEL service and additionally to at least one service, which may be an IN, service. For this example only the communication with two SCPs 121, 122 is shown. However, steps 6-11 may be repeated for a third SCP and so on. The following steps occur:

Step 401 ISUP Initial Address Message (IAM) arrives at the GMSC 110; the GMSC 110 analyses the Called Party Number in ISUP IAM and deduces that the Called Party Number is an MSISDN belonging to its own network.

Step 402 The GMSC 110 sends MAP Send Routing Information (SRI) to the HLR 111. The GMSC 110 indicates in MAP SRI that it supports CAMEL.

Step 403 The called subscriber has a subscription to a CAMEL service for MT call handling. As a result, the HLR 111 sends MAP SRI-Res to the GMSC 110, including the IN trigger information for MT calls, T-CSI.

Step 404 The GMSC 110 uses T-CSI to invoke a CAMEL service. The GMSC 110 instantiates an internal GSM Service Switching Function (gsmSSF) entity; the gsmSSF sends CAP Initial Detection Point (IDP) to the SCP. The address of the SCP1 121, and other data related to this IN dialogue, is obtained from T-CSI. The gsmSSF function interworks with the GMSC. Based on information defined in the user's subscription, and sent from the HLR to the GMSC, service triggers within the GMSC and gsmSSF are set. These triggers are used to dictate when the gsmSSF shall communicate with the gsmSCF. This in turn will determine how IN based services are handled.

Step 405 The SCP1 121 responds with CAP Continue (CUE), to inform the GMSC 110 that MT call handling may continue, i.e. the call may be delivered to the called subscriber. The control dialogue between SCP1 121 and GMSC 110 may be retained. The CAMEL service in SCP1 121 does not need to have knowledge about other IN services than the CAMEL service it's currently executing.

Step 406 The GMSC 110 sends a second interrogation to the HLR 111, i.e. sends a second MAP SRI to the HLR 111. The second MAP SRI includes the flag "suppress T-CSI".

Step 407 The HLR 111 recognizes the MAP SRI as a second SRI, by virtue of the presence of "suppress T-CSI", and responds by sending MAP Provide Roaming Number (PRN) to the VMSC 112 where the called party is currently registered.

Step 408 The VMSC 112 allocates an MSRN for this call and returns the MSRN to the HLR 111, by sending MAP PRN-Res to the HLR 111.

Step 409 The HLR 111 forwards the MSRN to the GMSC 110, by sending MAP SRI Response (SRI-Res) to the GMSC 110. The called subscriber subscribes to a second IN service for MT call handling. The second IN service is of the type Roaming Leg handling, as described in an earlier part of the present invention disclosure. The HLR 111 includes the IN trigger information associated with this second IN service, in the MAP SRI-Res. For the purpose of the present invention, this second IN trigger information is named "RICK" (Roaming leg IN Category Key). RICK may have the structure as T-CSI or TICK (Terminating IN Category Key). In order to be able to receive RICK, the GMSC 110 would have indicated in the 2nd MAP SRI (step 6) that it supports this information element, i.e. it supports RICK. This indication of "RICK support" is similar to the indication of "TICK support". The "TICK support", which is sent from GMSC to HLR, indicates to HLR that it supports the TICK. The TICK has functionality that may be compared with T-CSI; TICK is, however, not standardised.

Step 410 The GMSC 110 recognizes that the MSRN is accompanied by a RICK. The RICK serves as an indication for the GMSC 110 that the roaming leg shall be subject to an IN service. The GMSC 110 therefore uses RICK to invoke an IN service, by sending CAP IDP to the SCPn 122. The address of the SCPn 122, and other data related to this IN dialogue, is obtained from RICK.

Step 411 The SCPn 122 responds with CAP CUE, to inform the GMSC 110 that MT call handling may continue, i.e. the roaming leg towards the called subscriber may be established.

Step 412 The GMSC 110 establishes the roaming leg towards the called subscriber, by sending ISUP IAM towards the destination exchange. The ISUP IAM contains the MSRN that was received from the HLR 111.

Steps 401-408 represent normal GSM call handling.

Step 409 represents an enhancement to the existing MT call handling. The HLR 111 will normally return only the MSRN to the GMSC 110. Step 409 adds the RICK to the MAP SRI-Res.

Step 410 and step 411 do not exist in existing Roaming Leg handling. These steps represent the invocation of the second IN service for the MT call handling in the GMSC 110.

When the call is delivered to the called subscriber, the two IN services may remain active. The first IN service, triggered as a result of the sending of T-CSI to the GMSC 110, may remain active for the entire call and has the full capability available as allowed by the IN protocol used for that service.

The second IN service, triggered as a result of the sending of RICK to the GMSC 110, may also remain active for the entire call. This IN service shall, however, use the IN capability with certain restrictions. As an example, this service shall not apply call forwarding, as that would affect a pre-paid service for the call.

The present invention may be applied on various types of GSM call forwarding. This may be shown most adequately by taking a service like Personal Greeting Service (PGS) as an example. In the case of call forwarding, the destination of the call changes. Some operators require that the PGS service be terminated when call forwarding to a voice mailbox takes place.

With regard to terminating a PGS service in a call forwarding situation there are basically two types of call forwarding: Early call forwarding (ECF) and Late Call Forwarding (LCF)

When early call forwarding takes place in the GMSC 110, the GMSC 110 does not receive an MSRN form the HLR 111 for this call and no roaming leg is established. The GMSC 110 will not establish a roaming leg to the called party and as a result, no roaming-leg IN service will be invoked.

In the case of early call forwarding, the HLR 111 does not return an MSRN in the second SRI Result and, according to the present invention, does not return the RICK. The GMSC 110 now forwards the call to the forwarded-to destination, which may e.g. be a voice mailbox or call completion service. Since the HLR 111 has not returned RICK, there will not be a PGS invocation. The calling subscriber may now hear any announcement that is played by the voice mailbox, even when the voice mailbox defers the generation of the ISUP Answer Message (ISUP ANM) for a defined duration.

When late call forwarding takes place in the VMSC 112, then Optimal Routing of Late Call Forwarding (ORLCF) may be applied to return the call handling to the GMSC 110. The GMSC 110 terminates the roaming leg and hence, the roaming-leg IN service will be terminated as well. In the case of late call forwarding, the call is already routed to the destination MSC of the called subscriber. When the late call forwarding condition occurs, the VMSC 112 may send MAP Resume Call Handling (RCH) to the GMSC 110; the sending of MAP RCH is part of ORLCF.

When the GMSC 110 receives MAP RCH and approves the request for ORLCF, it releases the roaming leg and creates a forwarded leg. The calling party may hear any announcement generated by the forwarded-to destination.

Some operators deploy a voice mailbox system whereby the initial announcement is free of charge. This may be accomplished by having the voice mailbox defer the generation of the ISUP ANM. If PGS remains active in such situation, then the calling party will not hear any announcement that is played between ISUP Address Complete Message (ACM) and ISUP ANM. Reason is that the personal greeting remains active until the ISUP ANM is detected. The initial announcement of the voice mail would in that case not be heard.

The present invention resolves that problem, since PGS will be terminated in the case of late call forwarding in combination with ORLCF.

If late call forwarding is not subject to ORLCF, then the Roaming Leg service may monitor for ISUP messages such as Call Progress (CPG) and ACM. These ISUP messages may indicate that forwarding is taking place.

Some operators apply a service node solution for PGS. This means that for PGS subscribers, the roaming leg needs to be routed through a special service node (located in-line with the ISUP traffic link for the roaming leg). The service node will propagate the call to the destination MSC. The routing of the roaming leg through a service node may be accomplished in accordance with the present invention. The IN service that is invoked with RICK may provide a prefix for the MSRN, resulting in that the call is routed through the service node.

Alternatively, the RICK that is included in the SRI-Res may have the form of a number prefix; a switching node such as a GMSC places the RICK in front of the MSRN, prior to forwarding the call to a next switching node.

The B-number analysis in this transition node may be configured such that the RICK results in the selection of a route to the service node.

The concept of a subscribed or generic IN service for a roaming leg may be used for the following type of services:

Personal greeting: the playing of the personal greeting is required only when the roaming leg is successfully established; if the roaming leg can, for whatever reason, not be established or is terminated before answer, then the personal greeting is not required. An operator may wish to invoke PGS prior to the allocation of a MSRN for the call. The effect of that may be that when forwarding to a second called party takes place, the calling party will still hear a first party's personalised greeting. In addition, such configuration would have the effect that call forwarding announcements may not be heard.

Service-node routing: for a particular subscriber, the roaming leg may need to be routed through a service node.

Carrier selection: a subscriber may subscribe to a carrier selection service that is applicable for roaming leg only.

When the HLR 111 sends SRI-Res to GMSC 110 including MSRN, it may include RICK. As an implementation option, the HLR 111 may apply criteria for the inclusion of RICK in SRI-Res, similar to the case whereby the HLR 111 applies criteria for the inclusion of T-CSI in the first SRI-Res. These criteria may e.g. be:

include RICK in SRI-Res only when subscriber is in HPLMN;

include RICK in SRI-Res only when the incoming call is a speech call

Not all MT calls need a terminating IN service. Likewise, not all MT calls need a RICK service. As an example, when a pre-paid subscriber is in the HPLMN, the HLR 111 may suppress T-CSI in SRI. As a result, there will not be a MT call service triggered. If the invocation of the Roaming leg service is still required in this case, then the HLR 111 may include RICK in the first SRI-Res. The further handling of RICK in the GMSC 110 is as described earlier.

Figure 5:
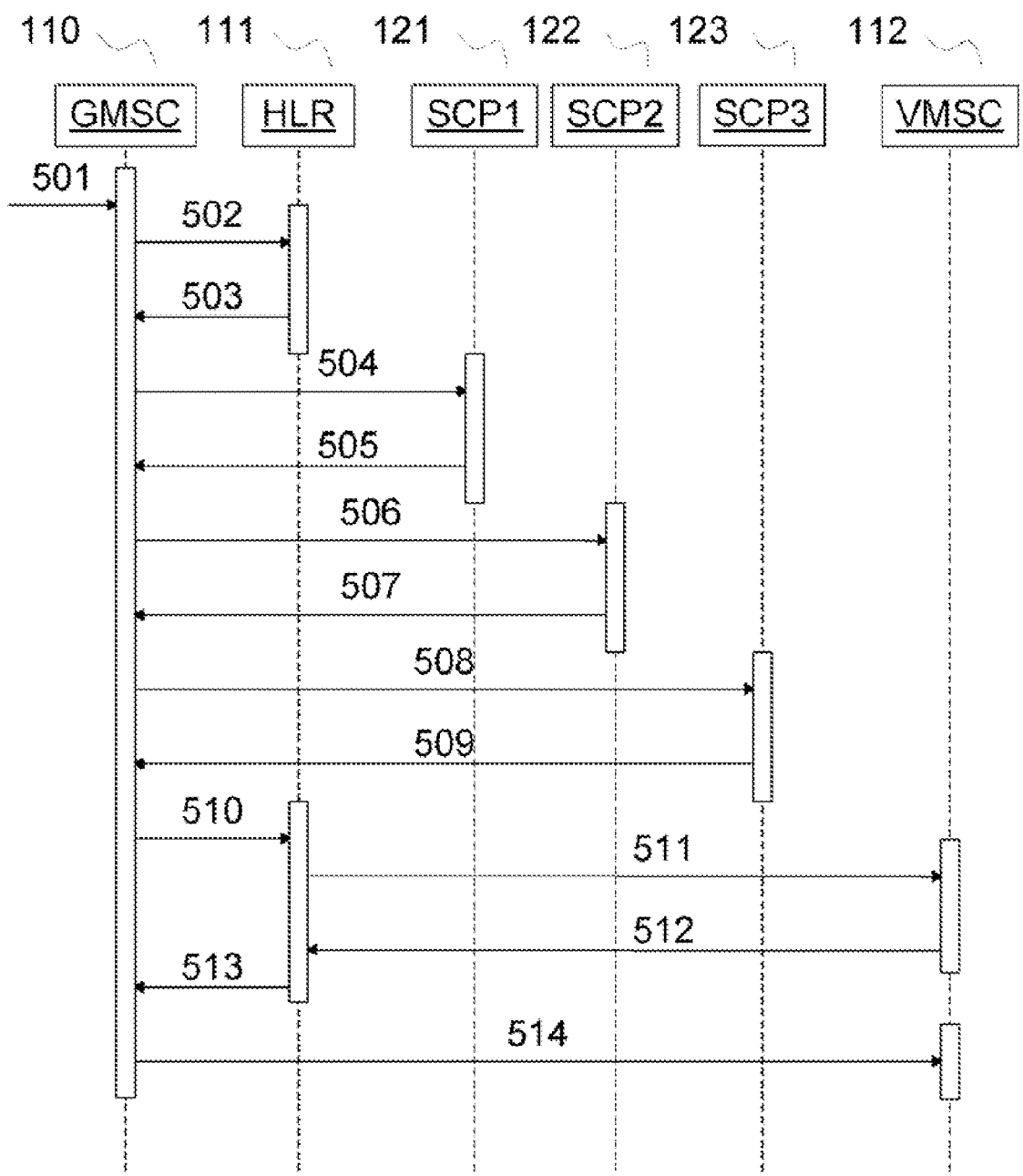
FIG. 5 is a signalling diagram of an embodiment of the method of the present invention.

FIG. 5 is a signalling diagram of an embodiment of the method of the present invention, wherein the invocation of multiple services is performed by a GMSC 110 interrogating an HLR 111 for multiple (IN) services before the GMSC 110 sets up the roaming leg. In this embodiment the HLR 111 sends all the information of the IN services at the first interrogation. Steps 501-502 are performed according to the current state of the art. In this example 3 SCPs are involved, although the invention is applicable to multiple SCPs.

Step 501 ISUP IAM arrives at the GMSC 110.

Step 502 The GMSC 110 analyses the Called Party Number in ISUP IAM and deduces that the Called Party Number is an MSISDN belonging to its own network. The GMSC 110 sends MAP SRI to the HLR 111. The GMSC 110 indicates in MAP SRI that it supports CAMEL. The GMSC may support multiple CAMEL phases.

Step 503 The called subscriber has a subscription to a CAMEL service for MT call handling. As a result, the HLR 111 sends MAP SRI-Res to the GMSC 110 including IN trigger information for MT calls, T-CSI.

Step 504 The GMSC 110 uses T-CSI to invoke a CAMEL service. The GMSC 110 instantiates an internal gsmSSF entity; the gsmSSF sends CAP IDP to the SCP 121. The address of the SCP1 121, and other data related to this IN dialogue, is obtained from T-CSI.

Step 505 The SCP1 121 responds with CAP Continue (CUE) or CAP Connect (CON), to inform the GMSC 110 that MT call handling may continue, i.e. the call may be delivered to the called subscriber. The control dialogue between SCP1 121 and GMSC 110 may be retained or terminated, depending on IN service requirements. The CAMEL service in SCP1 121 has no knowledge about other IN services than the CAMEL service that it is currently executing.

Step 506 The GMSC 110 responds by invoking a second IN service, which could again be a CAMEL service, based on T-CSI. The address of SCPn 122 is obtained from the second T-CSI.

Step 507 The SCP responds with CAP CUE or CAP CON, to inform the GMSC 110 that call handling may continue, i.e. the call may be delivered to the called subscriber. Here as well, the CAMEL service in SCP2 122 has no knowledge about the first service and the third service for this call.

Step 508 The GMSC 110 checks whether further IN services are provisioned for the subscriber; if they are, then it responds by invoking the third IN service, which could again be a CAMEL service, based on T-CSI. The address of SCP3 123 is obtained from the third T-CSI.

Step 509 The SCP 123 responds with CAP CUE or CAP CON, to inform the GMSC 110 that call handling may continue, i.e. the call may be delivered to the called subscriber. The CAMEL service in SCP3 123 has no knowledge about the first service and the second service for this call.

Step 510 The GMSC 110 checks whether further IN services are provisioned for the subscriber; if there are no more IN services for the subscriber, then the GMSC 110 responds by sending a second interrogation to the HLR 111, i.e. sends a second MAP SRI to the HLR 111.

Step 511 The HLR 111 recognises the MAP SRI as a second SRI and responds by sending MAP Provide Roaming Number (PRN) to the VMSC 112 where the called party is currently registered.

Step 512 The VMSC 112 allocates an MSRN and returns the MSRN to the HLR 111, by sending MAP PRN-Res to the HLR 111.

Step 513 The HLR 111 forwards the MSRN to the GMSC 110, by sending MAP SRI-Res to the GMSC 110.

Step 514 The GMSC 110 establishes the roaming leg towards the called subscriber, by sending ISUP IAM towards the destination exchange. The ISUP IAM contains the MSRN that was received from the HLR 111.

Figure 6:
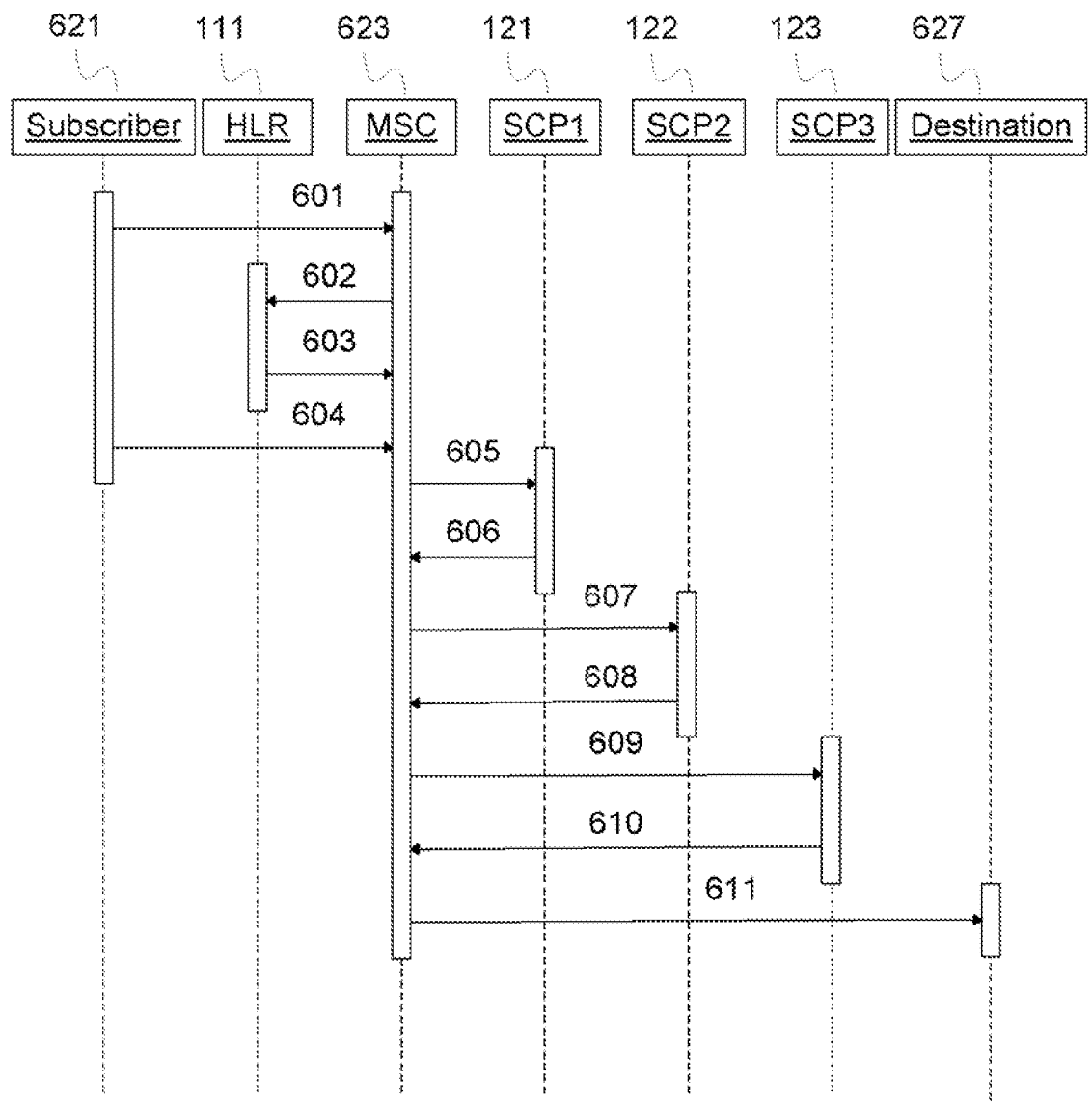
FIG. 6 is a signalling diagram of an embodiment of the method of the present invention.

FIG. 6 is a signalling diagram of an embodiment of the method of the present invention, whereby multiple IN services are invoked for an MO call. The following steps occur in this embodiment.

Step 601 A subscriber 621 registers with an MSC 623 in a visited GSM network.

Step 602 The MSC 623 contacts the HLR 111 in the Home PLMN of the subscriber 621.

Step 603 HLR 111 sends multiple trigger elements for IN services to the MSC 623. These trigger elements are associated to IN services for mobile originating calls and mobile forwarding calls.

Step 604 The subscriber 621 establishes an MO call.

Step 605 The MSC 623 uses a first trigger element to invoke a first IN service in SCP1 121 associated with the first trigger element.

Step 606 The first IN service in SCP1 121 gives control of the call back to the MSC 623, by sending a CAP Continue message or a CAP Connect message Step 607 The MSC 623 uses the second trigger element from the list of trigger elements to invoke a second IN service in SCP2 122.

The steps 605 and 606 are repeated with SCP 2 122 (steps 607, 608) and SCP3 123 (609, 610) and further, until all indicated IN services are invoked. Call processing in MSC 623 continues with step 611 as normal:

Step 611 The MSC 623 routes the call to the destination 627. Any of the invoked IN services may remain active for the entire duration of the call, or may terminate at an earlier stage.

The following scenarios are covered by the invention:
1) IN service invocation in GMSC for MT call handling, followed by IN service invocation in GMSC for roaming leg.
2) IN service invocation in GMSC for roaming leg.
3) As (1), whereby the HLR sends multiple IN service trigger elements in the first interrogation response, with the purpose that these multiple trigger elements are used for the invocation of multiple IN services associated with the MT call.
4) As (1), whereby the HLR sends multiple IN service trigger elements in the second interrogation response, with the purpose that these multiple trigger elements are used for the invocation of multiple IN services associated with the roaming leg.
5) As (2), whereby the HLR sends multiple IN service trigger elements in the second interrogation response, with the purpose that these multiple trigger elements are used for the invocation of multiple IN services associated with the roaming leg.
6) As (1), whereby (3) and (4) are combined.
7) As (1), whereby the HLR sends multiple IN service trigger elements in the first interrogation response, with the purpose that some of these multiple trigger elements are used for the invocation of multiple IN services associated with the MT call and some of these multiple trigger elements are used for the invocation of multiple IN services associated with the roaming leg.
8) Certain IN services for MT calls are required only when a roaming leg is established. The present invention offers the tools to accomplish this.
9) The present invention may be used to route a roaming leg through an ISUP service node on a subscription basis or generically for all served subscribers.

The invention claimed is:

1. A method for handling a call to a subscriber's mobile station of a mobile telecommunications network, the network comprising a control node and a Home Location Register (HLR), the method comprising the steps of the control node:
sending a Mobile Application Part—Send Routing Information (MAP SRI) to the HLR, the MAP SRI including a Suppress T-CSI flag,
receive in return a Mobile Application Part—Send Routing Information response (MAP SRI Res) including a Mobile Station Roaming Number (MSRN) and a roaming leg IN category key (RICK) from the HLR; and
using said RICK, together with said Mobile Station Roaming Number in said response, for further handling of a roaming leg of the call.

2. The method according to claim 1, one or more Service Control Points providing Intelligent Network (IN) services associated with said call and wherein the step of using said RICK for the further handling of the roaming leg of the call further comprises the control node:
retrieving from said RICK one or more trigger elements;
invoking services in said Service Control Points using said trigger elements;
receiving from said Service Control Points information related to said services associated with said trigger elements; and
routing the roaming leg of the call to a Visiting Mobile service Switching Center.

3. The method according to claim 2, further comprising the control node:
receiving from a Visiting Mobile service Switching Center a Mobile Application Part—Resume Call Handling (MAP-RCH) message as part of an Optimal Routing of Late Call Forwarding (ORLCF); and
releasing the roaming leg of the call, terminating said IN services associated with said roaming leg of the call and creating a forwarding leg.

4. The method according to claim 1, wherein the step of using said roaming leg IN category key further comprises the control node:

retrieving from said RICK a prefix or suffix to the Mobile Station Roaming Number;

adding said prefix or suffix to the Mobile Station Roaming Number; and routing the roaming leg of said call to a service node.

5. The method according to claim 1, the step of using the roaming leg IN category key further comprises the control node:

retrieving from said roaming leg IN category key a prefix or suffix to the Mobile Station Roaming Number;

adding the prefix or suffix to the Mobile Station Roaming Number; and routing the roaming leg or said call to a next switching node for the purpose of carrier selection.

6. The method according to claim 1, the step of sending said MAP-SRI further comprising;

Including in the MAP-SRI an indication that the control node supports RICK.

7. The method according to claim 2, wherein a plurality of said service trigger elements is comprised in one Mobile Application Part message.

8. The method according to claim 7, wherein said one Mobile Application Part message is sent from said Home Location Register to said Control Node in multiple Signaling Connection Control Part messages, due to Mobile Application Part segmentation.

9. The method according to claim 2 wherein a first service of said IN services is executed in a first Service Control Point of said one or more Service Control Points and a second service of said IN services is executed in a second Service Control Point of said one or more Service Control Points.

10. The method according to claim 8, wherein a first IN service of said services is a pre-paid charging service and a second service is one of a mobile terminating service, including a personal greeting service.

11. The method according to claim 1, wherein said control node is one of a Gateway Mobile services Switching Center (GMSC), or a Mobile services Switching Center (MSC).

12. A control node for handling a call to a subscriber's mobile station of a mobile telecommunications network, the network comprising said control node and a Home Location Register (HLR), the control node comprising:

a processor, and a memory storing instructions that, when executed, cause the control node to:

send a Mobile Application Part—Send Routing Information (MAP SRI) to said HLR, the MAP SRI including a Suppress T-CSI flag and an indication for support of a roaming leg IN category key (RICK), receive in return a Mobile Application Part—Send Routing Information response (MAP SRI Res) including a Mobile Station Roaming Number (MSRN) and a roaming leg IN category key (RICK) from the HLR; and using said RICK, together with said Mobile Station Roaming Number in said response, for further handling of a roaming leg of the call.

13. The control node according to claim 12, wherein said control node is one of a Gateway Mobile services Switching Center (GMSC) or a Mobile services Switching Center (MSC).

14. The control node according to claim 12, wherein the instructions that cause the control node to send to the Home Location Register one or more requests for routing information associated with said call, wherein an indication is set for support of the RICK in the one or more requests further causes the control node to:

retrieve from said roaming leg IN category key one or more trigger elements;

invoke services in Service Control Points using said trigger elements;

receive from said Service Control Points information related to said services associated with said trigger elements; and route the roaming leg of the call to a Visiting Mobile service Switching Center.

15. The control node according to claim 12, further comprises instructions causing the control node to:

receive from a Visiting Mobile service Switching Center a Resume Call Handling message as part of an Optimal Routing of Late Call Forwarding; and terminate the roaming leg of the call and the invoked service for the roaming leg.

16. The control node according to claim 12, further comprises instructions to cause the control node to:

retrieve from said RICK a prefix or suffix to a Mobile Station Roaming Number;

add said prefix or suffix to the Mobile Station Roaming Number; and route the roaming leg or said call to a service node.

17. The control node according to claim 12, further comprises instructions to cause the control node to:

retrieve from said RICK a prefix or suffix to a Mobile Station Roaming Number;

add the prefix or suffix to the Mobile Station Roaming Number; and route the roaming leg or said call to a next switching node for carrier selection.

18. A method for handling a call to a subscriber's mobile station in a mobile telecommunications network, the network comprising a control node and a Home Location Register, the method comprising the steps of the Home Location Register;

receiving from said control node, one or more Mobile Application Part—Send Routing Information (MAP SRI) requests for routing information associated with said call, checking if a Suppress T-CSI parameter is set in said request, and in the affirmative;

sending a Mobile Application Part—Send Routing Information response (MAP-SRI Res) to said control node including a Mobile Station Roaming Number (MSRN) and a roaming leg IN category key (RICK).

19. The method of claim 18, wherein the step of checking further comprises checking one or more from the following conditions;

an indicator supporting said RICK is present in said request, the subscriber is present in HPLMN, the call is a speech call, and early call forwarding is not applicable for the call.

20. A Home Location Register, for handling a call to a subscriber's mobile station of a mobile telecommunications network, the network comprising said Home Location Register (HLR) and a control node, the control node comprising:

a processor, and a memory storing instructions that, when executed, cause the Home Location Register to receive from said control node, one or more Mobile Application Part—Send Routing Information (MAP SRI) requests for routing information associated with said call, check if a Suppress T-CSI parameter is set in said request, and in the affirmative;

send a Mobile Application Part—Send Routing Information response (MAP-SRI Res) to said control node including a Mobile Station Roaming Number (MSRN) and a roaming leg IN category key (RICK).

21. The Home Location Register of claim 20, wherein the memory further comprises instructions to cause the Home Location register to check the following conditions:

an indicator supporting said RICK is present in said request, the subscriber is present in HPLMN, the call is a speech call, and early call forwarding is not applicable for the call.

* * * * *

UNITED STATES PATENT AND TRADEMARK OFFICE
CERTIFICATE OF CORRECTION

PATENT NO. : 8,254,940 B2
APPLICATION NO. : 13/353499
DATED : August 28, 2012
INVENTOR(S) : Noldus et al.

It is certified that error appears in the above-identified patent and that said Letters Patent is hereby corrected as shown below:

On the Title Page, in Item (57), under "ABSTRACT", in Column 2, Line 9, delete "one ore more" and insert -- one or more --, therefor.

In Column 4, Line 39, delete "one ore more" and insert -- one or more --, therefor.

In Column 5, Line 23, delete "is," and insert -- is --, therefor.

In Column 5, Line 34, delete "one ore more" and insert -- one or more --, therefor.

In Column 6, Line 62, delete "one ore more" and insert -- one or more --, therefor.

In Column 13, Line 18, in Claim 6, delete "comprising;" and insert -- comprising: --, therefor.

Signed and Sealed this
Thirteenth Day of November, 2012

David J. Kappos
*Director of the United States Patent and Trademark Office*